United States Patent [19]

Price

[11] 4,445,864
[45] May 1, 1984

[54] READING AND SPELLING AID

[76] Inventor: John K. Price, 14 Pembridge Close, Charlton Kings, Cheltenham, England

[21] Appl. No.: 345,013

[22] Filed: Feb. 2, 1982

[30] Foreign Application Priority Data

Feb. 3, 1981 [GB] United Kingdom ............... 8103221

[51] Int. Cl.³ ........................................... G09B 17/00
[52] U.S. Cl. .................................... 434/173; 434/178
[58] Field of Search ............... 434/173, 178, 404, 405, 434/342, 347, 348, 349, 167, 174, 180, 181, 182; 40/518

[56] References Cited

U.S. PATENT DOCUMENTS

| 375,774 | 1/1888 | Schuman | 434/167 |
| 951,637 | 3/1910 | Feilhuber | 40/518 |
| 1,530,418 | 3/1925 | Saylor | 434/167 |
| 3,991,498 | 11/1976 | Beach | 40/518 |

Primary Examiner—William H. Grieb
Attorney, Agent, or Firm—Young & Thompson

[57] ABSTRACT

A moulded plastics casing comprising a lid and a base accommodates two moulded plastics rotatable spools formed with projecting operating knobs. A roll of flexible plastics material or paper having letters of the alphabet printed thereon is provided on one of the spools and has its free end engaged within a slot in the other spool so that the letters can be viewed through a reading window in the lid. The letters are arranged in a series of lines parallel to the axes of rotation of the spools and the lines form sets such that, as the lines of a set are viewed successively and one at a time through the reading window by turning one of the operating knobs, a word is progressively built up within the reading window. As each line appears in the window the letter or letters on that line should be sounded (reading) or the names of the letters recited (spelling). The words on the roll are related to one another by having sounds in common so as to form a "phonic progression". Other phonic progressions are formed on further rolls which may be inserted in the aid in place of the existing roll.

10 Claims, 4 Drawing Figures

READING AND SPELLING AID

BACKGROUND OF THE INVENTION

This invention relates to a reading and spelling aid, and has for its object an aid which may be used by adults or children who are either beginning to learn to read or who have learning problems, and which is moreover entertaining in use.

SUMMARY OF THE INVENTION

According to the invention there is provided a reading and spelling aid comprising two rotatable spools mounted with their axes of rotation parallel and spaced apart, a flexible strip extending between the spools and bearing letters of the alphabet arranged in a series of lines parallel to the axes of rotation of the spools, a reading window through which the letters on the strip may be viewed one line at a time, and operating means for rotating the spools to cause the lines of letters on the strip to move past the reading window, the arrangement of letters on the strip being such that, in operation as successive lines of letters are viewed one at a time through the reading window, a word is progressively built up within the reading window.

For example, the first line of a set of successive lines may comprise the first letter of a word, the second line of that set may comprise the first two letters of the word and so on, until the final line of the set comprises the complete word. Thus, as the lines are moved one at a time past the reading window, the word is built up one letter at a time within the reading window. Where the aid is used as a reading aid, the user should sound the first letter and thereafter the sounds made by the combination of letters as they appear within the reading window. Where the aid is used as a spelling aid, the names of the letters should be spelt out as they appear within the reading window. In certain circumstances it may be appropriate for two successive lines in a set to differ by more than one letter in length or for the first line to comprise more than one letter.

The flexible strip preferably bears a plurality of sets of lines of letters for building up a corresponding number of words, at least some of these words possibly being related to one another by having sounds in common. Thus a series of words may be provided on the strip forming what may be termed a "phonic progression".

Furthermore it is desirable for the flexible strip to be replaceable by a further strip bearing a different phonic progression. It is envisaged that a number of strips each of which bears letters and words belonging to the same reading rule or sound pattern would be provided. The strip may be replaceable with at least one of the spools, and is preferably wound on to one of the spools which is detachable from the remainder of the aid and is engaged with the other spool by being passed through a slot in said other spool.

BRIEF DESCRIPTION OF THE DRAWINGS

In order that the invention may be more fully understood, an embodiment of the invention will now be described, by way of example, with reference to the accompanying drawings, in which.

DETAILED DESCRIPTION OF THE DRAWINGS

Figure 1:
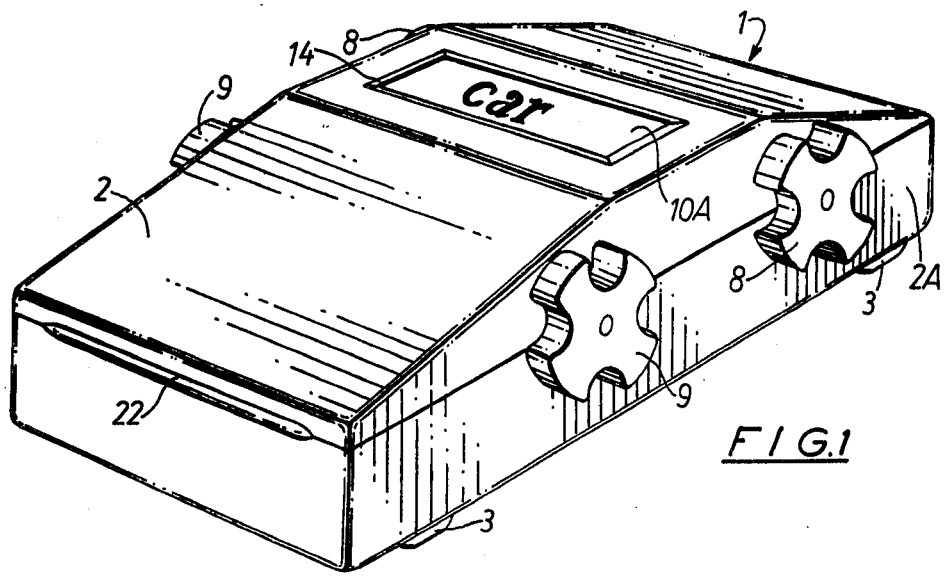
FIG. 1 is a perspective view of the reading aid.
Figure 2:
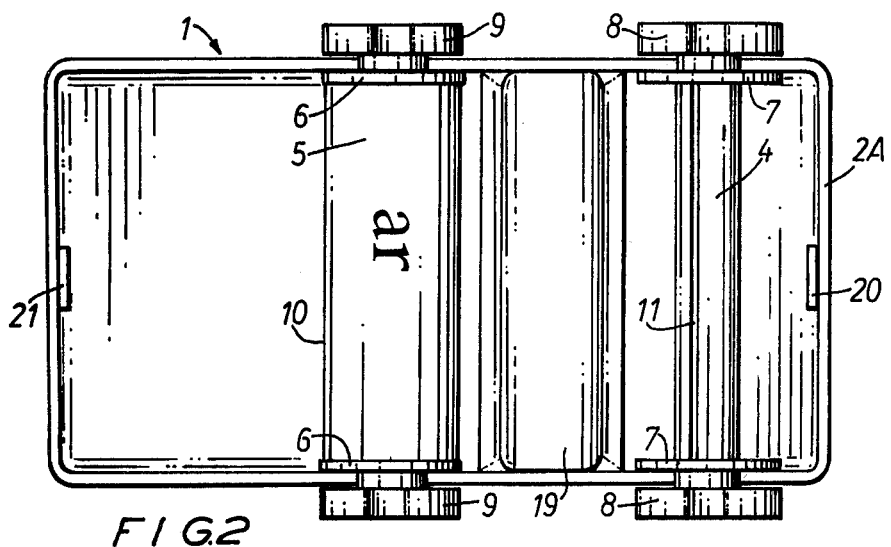
FIG. 2 is a view of the aid from above with the lid removed and with the flexible strip disengaged from one of the spools.
Figure 3:
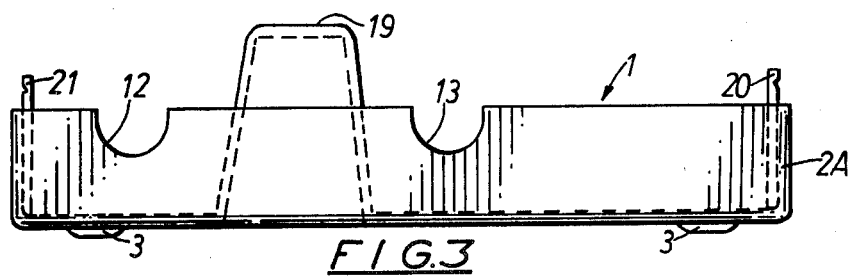
FIG. 3 is a view of the aid from one side with the lid and both spools removed.

Referring to FIGS. 1 to 3 the aid illustrated conprises a moulded plastics casing 1 comprising a lid 2 and a base 2A provided with four integrally formed feet 3. Within the casing 1 are two moulded plastics spools 4 and 5 whose spindles project through holes in the side walls of the casing 1 and are formed with shaped operating knobs 8 and 9 on each end externally of the casing 1. The lid 2, base 2A and spools 4 and 5 are formed by injection moulding.

The spool 5 is fitted with a roll 10 of flexible plastics material or paper having letters of the alphabet printed thereon, and the spool 4, which is arranged parallel to the spool 5, is provided with a slot 11 into which the free end of the strip 10A unwound from the roll 10 may be inserted to enable the spool 4 to act as a take-up spool. Both the spool 4 and the spool 5 are located within the casing 1 by snapping portions of their spindles intermediate the knobs 8 and 9 and adjacent circular flanges 6 and 7 on the spindles into recesses 12 and 13 (see FIG. 3) in the side walls of the base 2A. The engagement between the spools 4 and 5 and the base 2A is such as to retain the spools within the recesses 12 and 13 whilst enabling the spools to be turned by the operating knobs 8 and 9 against slight frictional resistance.

Furthermore the base 2A of casing 1 is provided with an integrally formed guide portion 19 which serves to tension the strip 10A of plastics material or paper between the two spools 4 and 5. The lid 2 is held on the base 2A by means of integrally formed catches 20 and 21 on the base 2A which engage projections (not shown) on the inside surface of the lid 2, and a projecting ledge 22 is formed on the outside of the lid 2 for ease in removing the lid. Furthermore the lid 2 is provided with shallow recesses (not shown) in positions corresponding to the recesses 12 and 13 in the base 2A to provide clearance for the spindles of the spools 4 and 5. When the spools 4 and 5 are disposed in the base 2A with the strip stretched between them and the lid 2 is in position, the portion of the strip 10A which passes over the guide portion 19 bears against the inside surface of the lid 2 and is viewable through a reading window 14 in the form of a slot in the lid having bevelled edges.

In order to prepare the aid for use the roll 10 on its spool 5 is fitted into the base 2A after removing the lid 2, and the end of the strip 10A of plastics material or paper is withdrawn from the roll 10 and inserted into the slot 11 in the spool 4 which is normally retained permanently in the base 2A. One of the knobs 8 is then rotated to wind the strip 10A on to the spool 4 until the strip 10A has been drawn down on to the guide portion 19. The lid 2 is then replaced, and the aid is ready for use.

Figure 4:
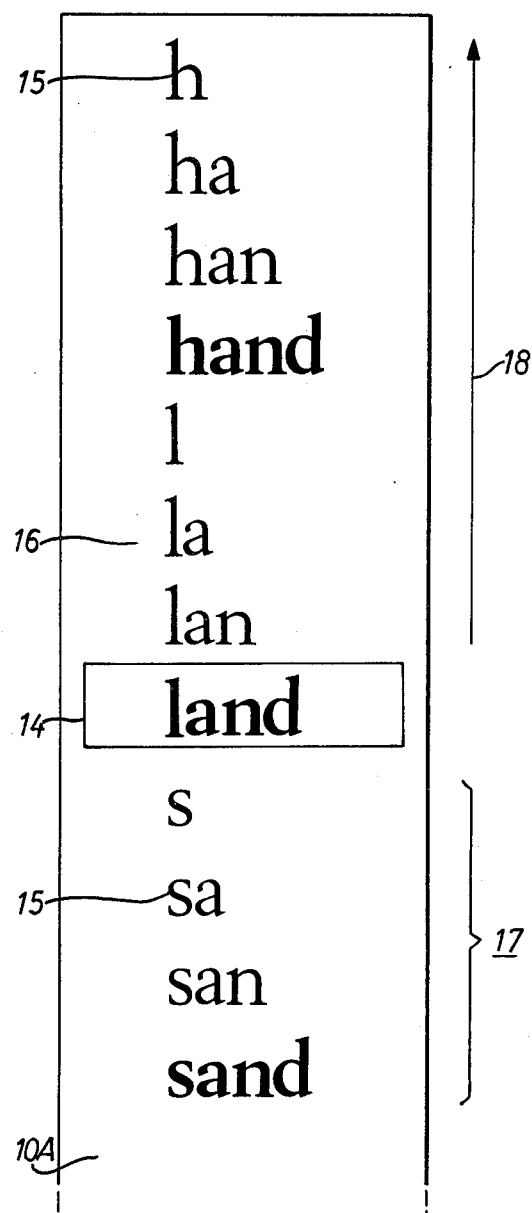
FIG. 4 shows part of the flexible strip.

Referring to FIG. 4, the strip 10A has printed on it letters of the alphabet 15 arranged in a series of lines 16 extending transversely of the strip 10A and parallel to the axes of rotation of the spools 4 and 5. The lines 16 form sets 17 of lines, the first line of each set 17 comprising the first letter of a four-letter word, such as "hand", the second line comprising the first two letters of the word, the third line comprising the first three letters of the word, and the final line of the set 17 comprising the complete word. A number of sets 17 are provided on the strip 10A forming what may be termed a "phonic progression".

In use of the aid the lines 16 are viewed one at a time through the reading window 14. The first line of a set 17 is first aligned with the reading window 14 by means of the knobs 8 and 9, and that letter sounded. One of the knobs 8 is then rotated to move the strip 10A in the direction of the arrow 18, until the second line of the set 17 is visible in the reading window 14. The letters on this line are then sounded with the sounds of the letters being blended. This action is repeated to render the third line visible and finally the whole word. Thus words are built up progressively within the reading window 14, and the letters and words are sounded by the user as they appear in the reading window 14. As each line after the first line is read a new sound is added to the sound of the previous line, and in this way knowledge of the sound of the whole word is built up step by step. This is continued until all the words on the roll 10 have been read. If desired the strip 10A may be rewound on to the spool 5 by rotating one of the knobs 9, and the roll 10 replaced by another roll bearing a different "phonic progression". A number of different rolls may be stored within a box (not shown).

The aid may also be used for teaching spelling in which case the name of each letter appearing within the reading window 14 should be spelt out line by line beginning with the first letter on each line.

It is not essential that a word should be built up one letter at a time. For example, particularly when building certain more complex words or words of more than one syllable, groups of two or more letters may be added between successive lines in a set at certain positions within the word. In a development of this aid, for use by more advanced students, words comprising a plurality of syllables are built up one syllable at a time or a part-word at a time.

Each of the rolls is characterised by a number and has this number printed thereon together with a brief description, such as "short a", of the phonic progression thereon. Furthermore each line of letters forming a full word is printed in a bolder type than the other lines of letters.

The reading and spelling aid is capable of being used for self-instruction as well as under supervision and is adaptable to any language.

I claim:

1. A reading and spelling aid comprising two rotatable spools mounted with their axes of rotation parallel and spaced apart, a flexible strip extending between the spools and bearing letters of the alphabet arranged in a series of lines parallel to the axes of rotation of the spools, a reading window through which the letters on the strip may be viewed, only one line at a time, and operating means for rotating the spools to cause the lines of letters on the strip to move past the reading window only one at a time, the arrangement of letters on the strip being such that, in operation as successive lines of letters are viewed, only one at a time, through the reading window, a word is progressively built up within the reading window, the flexible strip bearing a plurality of sets of lines of letters for building up a corresponding number of words, said sets being arranged in a series lengthwise of the strip.

2. A reading and spelling aid according to claim 1, wherein at least some of the words of the strip are related to one another by having sounds in common.

3. A reading and spelling aid according to claim 1, wherein the flexible strip is replaceable by a further flexible strip bearing letters of the alphabet arranged in a series of lines for building up a different word or group of words.

4. A reading and spelling aid according to claim 3, wherein the flexible strip is replaceable with at least one of the spools to which it is attached.

5. A reading and spelling aid according to claim 4, wherein the flexible strip is wound on to one of the spools which is detachable from the remainder of the aid and is engaged with the other spool by being passed through a slot in said other spool.

6. A reading and spelling aid according to claim 1, wherein the spools are disposed within a casing, and the operating means is in the form of one or more knobs disposed externally of the casing and attached to the spools or one of the spools.

7. A reading and spelling aid according to claim 6, wherein the casing comprises a base and a lid, and at least one of the spools forms a snap-coupling within recesses in side walls of the base.

8. A reading and spelling aid according to claim 7, wherein the reading window is formed in the lid.

9. A reading and spelling aid according to claim 8, wherein the base incorporates a guide portion for guiding the strip in the vicinity of the reading window.

10. A reading and spelling aid according to claim 6, wherein the casing and spools are formed by injection moulding.

* * * * *